US011228552B1

(12) United States Patent
Venkatachalam et al.

(10) Patent No.: US 11,228,552 B1
(45) Date of Patent: Jan. 18, 2022

(54) AUTOMATICALLY HANDLING MESSAGES OF A NON-OPERATIONAL MAIL TRANSFER AGENT WITHIN A VIRTUALIZATION CONTAINER

(71) Applicant: ServiceNow, Inc., Santa Clara, CA (US)

(72) Inventors: Gopalakrishnan Venkatachalam, San Diego, CA (US); Thomas Ryan Jackson, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/075,558

(22) Filed: Oct. 20, 2020

(51) Int. Cl.
*H04L 12/58* (2006.01)
*H04L 29/08* (2006.01)

(52) U.S. Cl.
CPC .......... *H04L 51/22* (2013.01); *H04L 67/1031* (2013.01); *H04L 67/2842* (2013.01); *H04L 51/34* (2013.01)

(58) Field of Classification Search
None
See application file for complete search history.

(56) References Cited

U.S. PATENT DOCUMENTS

| | | | | |
|---|---|---|---|---|
| 8,224,902 B1* | 7/2012 | Glasser | ............... | H04L 51/12 709/206 |
| 9,729,551 B1* | 8/2017 | Karunakaran | ...... | H04L 63/0227 |
| 9,773,006 B1* | 9/2017 | Reker | ................ | G06F 11/1446 |
| 11,099,956 B1* | 8/2021 | Polimera | ............. | G06F 9/45558 |
| 2006/0168057 A1* | 7/2006 | Warren | .................. | H04L 51/12 709/206 |
| 2007/0094339 A1* | 4/2007 | Bauchot | ............... | G06Q 10/107 709/206 |
| 2009/0052638 A1* | 2/2009 | Schroeder | ............... | H04L 51/36 379/88.17 |
| 2014/0188812 A1* | 7/2014 | Vijayan | ............... | G06F 11/1469 707/679 |
| 2015/0052177 A1* | 2/2015 | Roseman | ............ | G06Q 10/107 707/822 |
| 2015/0150091 A1* | 5/2015 | Bruce | ................... | H04L 63/101 726/4 |
| 2016/0147782 A1* | 5/2016 | Roseman | ............... | G06Q 20/36 707/822 |
| 2016/0212012 A1* | 7/2016 | Young | ................ | G06F 9/45558 |
| 2018/0137139 A1* | 5/2018 | Bangalore | ........... | H04L 67/2842 |
| 2018/0267861 A1* | 9/2018 | Iyer | ......................... | G06F 3/065 |
| 2018/0288150 A1* | 10/2018 | Wang | .................. | G06F 11/1464 |
| 2018/0373597 A1* | 12/2018 | Rana | ...................... | G06F 16/907 |
| 2018/0375822 A1* | 12/2018 | Dahlberg | ............ | H04L 61/1505 |
| 2019/0182322 A1* | 6/2019 | Kumar | ................... | G06F 3/0638 |
| 2020/0241908 A1* | 7/2020 | Dornemann | ........ | G06F 11/2094 |
| 2021/0255771 A1* | 8/2021 | Kilaru | ..................... | G06F 3/065 |

* cited by examiner

*Primary Examiner* — Backhean Tiv
(74) *Attorney, Agent, or Firm* — Van Pelt, Yi & James LLP (57) ABSTRACT

A mail transfer agent configured to route and deliver electronic mail is executed within a virtualization container of a container deployment unit, wherein the mail transfer agent is configured to access a provisioned storage volume resource of a data storage. It is automatically detected that the mail transfer agent is not operational, including by detecting that the provisioned storage volume resource is no longer mounted by the container deployment unit, wherein the mail transfer agent has stored in the provisioned storage volume resource one or more messages remaining to be processed.

20 Claims, 6 Drawing Sheets

AUTOMATICALLY HANDLING MESSAGES OF A NON-OPERATIONAL MAIL TRANSFER AGENT WITHIN A VIRTUALIZATION CONTAINER

BACKGROUND OF THE INVENTION

A mail transfer agent (MTA) is a piece of software that transfers emails (electronic mail messages) between computers of email senders and computers of email recipients. Mail transfer agents may also be referred to as message transfer agents, mail transport agents, message transport agents, and so forth. A mail transfer agent can receive a message to transfer from another mail transfer agent, from a mail submission agent, from a mail user agent, etc. A mail transfer agent can have a queue of messages to be transmitted. In many scenarios, delays in message transfer occur due to mail transfer agent and/or system failures, in which case manual intervention to transition queued messages is oftentimes required. Thus, it would be beneficial to develop techniques directed toward automatically handling messages of mail transfer agents that are not able to function properly.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A mail transfer agent configured to route and deliver electronic mail is executed within a virtualization container of a container deployment unit, wherein the mail transfer agent is configured to access a provisioned storage volume resource of a data storage. It is automatically detected that the mail transfer agent is not operational, including by detecting that the provisioned storage volume resource is no longer mounted by the container deployment unit, wherein the mail transfer agent has stored in the provisioned storage volume resource one or more messages remaining to be processed. A technological benefit of the techniques disclosed herein is avoiding delays in email notifications, wherein delays may be a result of mail transfer agent and/or system crashes and/or scale downs. Delays associated with manual transitioning of emails that are queued are avoided.

Figure 1:
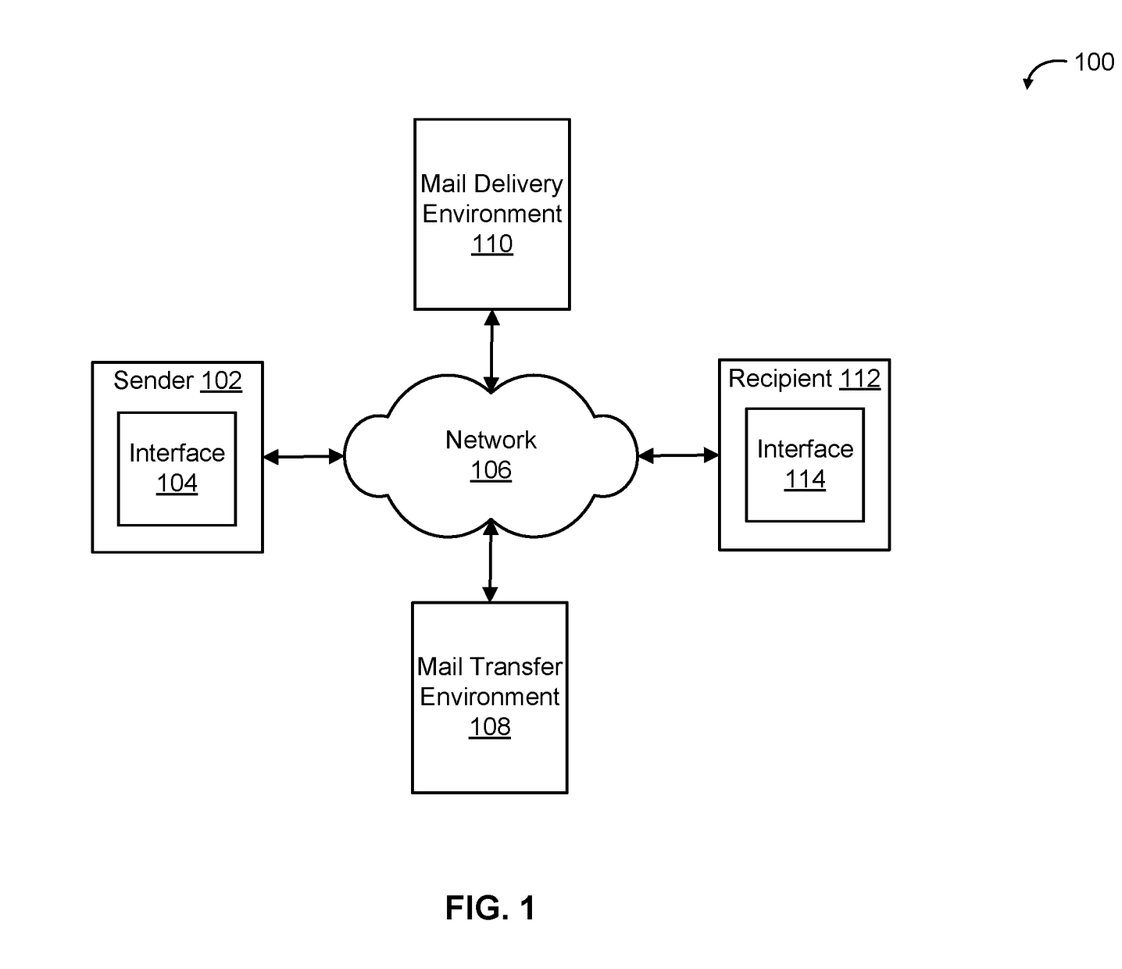
FIG. 1 is a block diagram illustrating an embodiment of a system for sending and receiving electronic mail messages.

FIG. 1 is a block diagram illustrating an embodiment of a system for sending and receiving electronic mail messages. In the example shown, system 100 includes sender 102, network 106, mail transfer environment 108, mail delivery environment 110, and recipient 112.

In the example illustrated, sender 102 includes interface 104. The number of senders shown in merely illustrative. It is possible for system 100 to include more senders. In various embodiments, sender 102 is a computer or other hardware device that a user utilizes to send an email (also referred to herein as electronic mail message, electronic mail, electronic message, mail message, mail, message, etc.). Examples of hardware devices include desktop computers, laptop computers, tablets, smartphones, and other devices. In various embodiments, interface 104 is a software user interface through which the user submits an email to send to a recipient. For example, the software user interface may be a web portal, internal network portal, or other portal, browser, mobile app, etc. In various embodiments, interface 104 is a mail user agent (MUA). An MUA, also referred to as an email client, is a computer application that allows the user to send and/or retrieve email.

In the example illustrated, sender 102 is communicatively connected to network 106 (as are mail transfer environment 108, mail delivery environment 110, and recipient 112). Emails are sent and received via network 106. Examples of network 106 include one or more of the following: a direct or indirect physical communication connection, mobile communication network, Internet, intranet, Local Area Network, Wide Area Network, Storage Area Network, and any other form of connecting two or more systems, components, or storage devices together.

In various embodiments, mail transfer environment 108 receives messages to deliver from sender 102 via network 106. It is also possible for a mail/message submission agent (MSA) to exist, wherein the MSA receives messages from MUAs to transfer to mail transfer environment 108. In some embodiments, transmission of messages from sender 102 to mail transfer environment 108 is specified according to Simple Mail Transfer Protocol (SMTP). In various embodiments, mail transfer environment 108 utilizes a store-and-forward model of mail handling in which outgoing mail is put into a queue. Attempts to send mail can be made recurrently, and if the mail fails to be delivered during a specified period, the mail can be returned to the sender. In various embodiments, as described in further detail herein, mail transfer environment 108 includes one or more mail transfer agents (MTAs) executing within virtualization containers of container deployment units (e.g., see FIG. 2). Mail transfer environment 108 may be implemented using one or more servers that are communicatively connected, wherein the servers are computers or other hardware components that support mail transfer functionality.

In various embodiments, mail delivery environment 110 receives messages from mail transfer environment 108 via network 106 to deliver to recipient 112. In various embodiments, mail delivery environment 110 includes a mail exchanger (MX) and/or a mail delivery agent (MDA). The MX may be utilized to look up records associated with recipient domains. In various embodiments, the MDA handles local delivery of messages to recipients. Mail delivery environment 110 may be implemented using one or more servers that are communicatively connected, wherein the servers are computers or other hardware components that support mail delivery functionality.

In the example illustrated, messages are delivered to recipient 112. The number of recipients shown in merely illustrative. It is possible for system 100 to include more recipients. In general, each sender can also receive emails, and each recipient can send emails. Recipient 112 may utilize a mail transfer environment (not shown) separate from mail transfer environment 108, and sender 102 may receive messages from a mail delivery environment (not shown) separate from mail delivery environment 110. In general, any number of senders, recipients, mail transfer environments, and mail delivery environments may exist. In the example shown, recipient 112 includes interface 114. In various embodiments, interface 114 is an MUA. In some embodiments, mail is set up for batch retrieval via interface 114. Mail may be retrieved by using Internet Message Access Protocol (IMAP), Post Office Protocol (POP), or another protocol.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, additional senders and recipients may exist. The number of components and the connections shown in FIG. 1 are merely illustrative. Components not shown in FIG. 1 may also exist.

Figure 2:
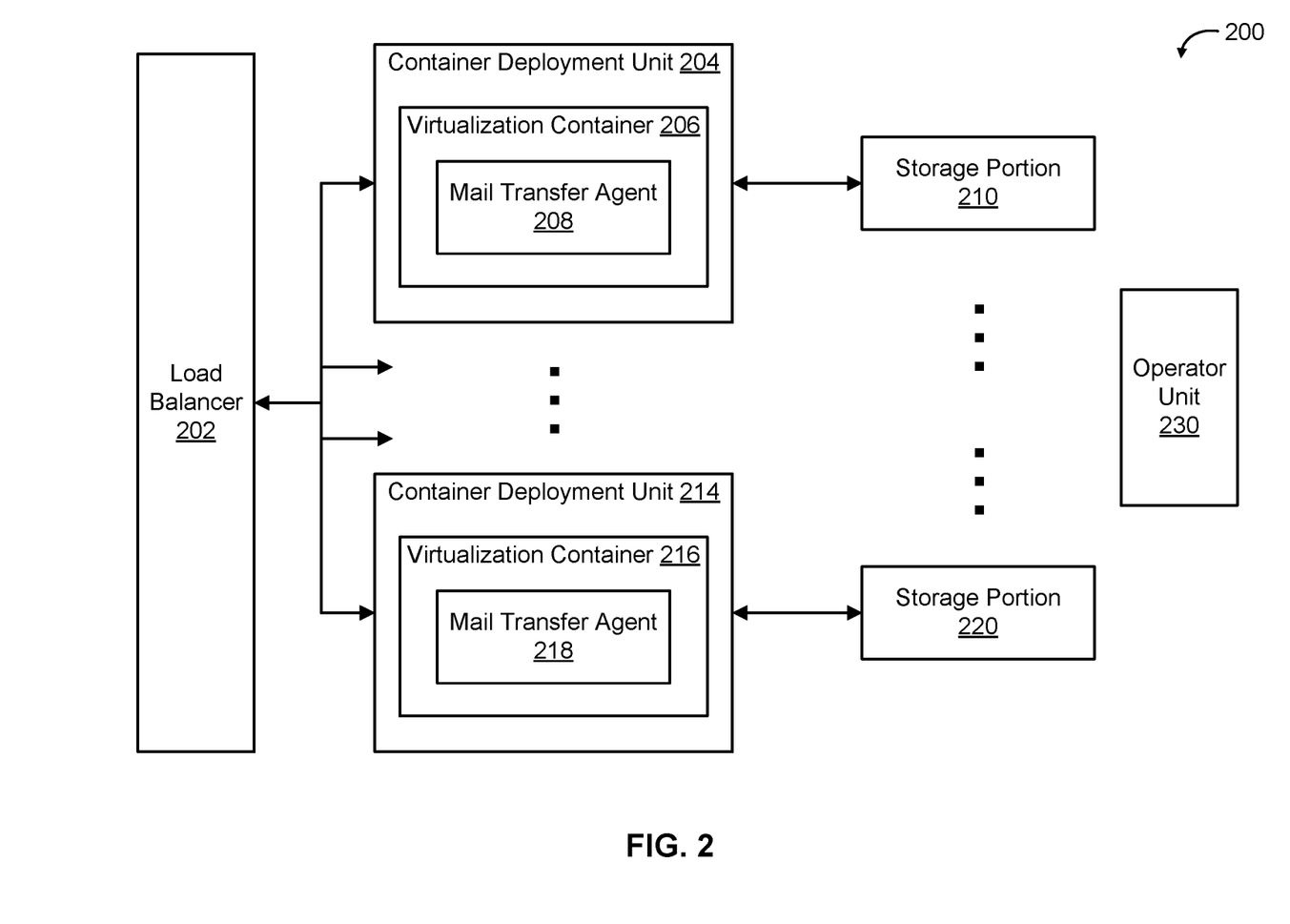
FIG. 2 is a block diagram illustrating an embodiment of a mail transfer environment.

FIG. 2 is a block diagram illustrating an embodiment of a mail transfer environment. In some embodiments, mail transfer environment 200 is mail transfer environment 108 of FIG. 1. In the example illustrated, mail transfer environment 200 includes load balancer 202, a plurality of container deployment units and corresponding storage portions, and operator unit 230. Each container deployment unit is associated with a virtualization container (also referred to herein simply as a container).

Figure 3:
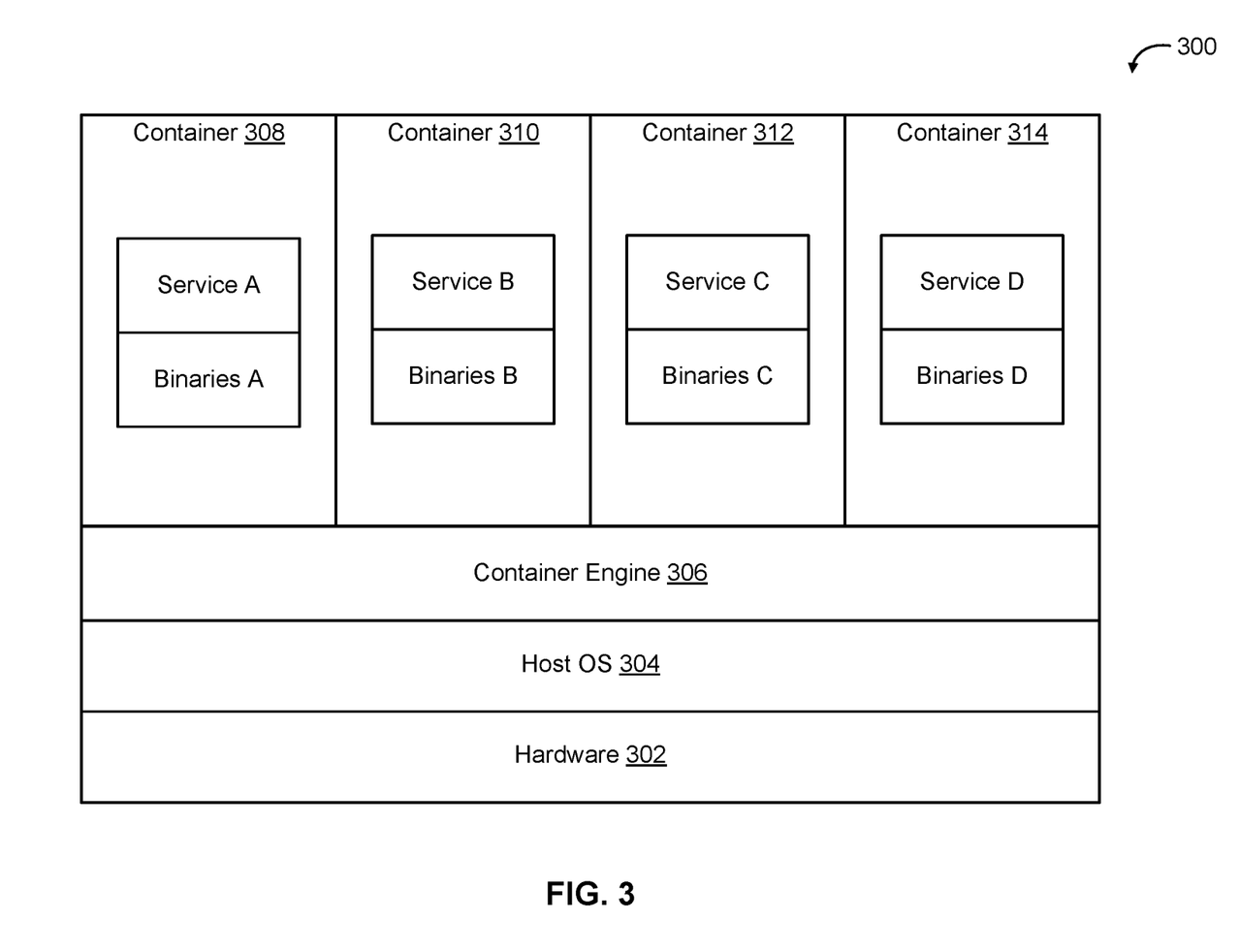
FIG. 3 is a diagram illustrating an example container virtualization architecture.

Mail transfer environment 200 employs a container virtualization architecture. As used herein, container virtualization refers to operating system (OS) level virtualization in which multiple isolated user spaces exist. OS level virtualization is distinguishable from hardware level virtualization with virtual machines in that each virtual machine needs its own OS, but each container can run without an independent OS. Thus, a benefit of container virtualization compared with virtual machines is reduced system overhead due to not needing to replicate OS resources. An example container virtualization architecture is shown in FIG. 3. In the example shown in FIG. 3, server 300 includes hardware 302 and host OS 304. Hardware 302 includes one or more processors (e.g., central processing units), memory (e.g., random-access memory (RAM)), storage (e.g., hard disk storage), input/output devices, and other hardware resources of server 300. In terms of hierarchy, host OS 304 is an OS that sits on top of hardware 302. Host OS 304 acts as intermediary software between hardware 302 and general computer programs running on server 300.

In terms of hierarchy, container engine 306 sits on top of host OS 304 and is software that allows multiple services, each potentially requiring a different OS (e.g., different from host OS 304), to run simultaneously on server 300. In various embodiments, container engine 306 provides an application programming interface (API)/user interface to allow a user to manage containers on server 300 (containers 308, 310, 312, and 314 in the example shown). For example, the API/user interface could be a command line interface. In various embodiments, container engine 306 is responsible for mapping container file components (also referred to as container images) to disk space of hardware 302. This mapping allows for various services (e.g., applications/ computer programs), such as Services A, B, C, and D in the example shown, to run simultaneously on a server with a single OS when the services are accompanied by corresponding binary files (Binaries A, B, C, and D, respectively). Containers 308, 310, 312, and 314 are isolated from one another. Stated alternatively, computer programs running inside of each container can only see that container's contents and devices assigned to that container. Each container is a software program that allows one or more of its applications to communicate with hardware resources without passing through its own OS. Along with binaries, environment variables and libraries for each containerized service are also typically stored in their respective containers. Advantages of containers (e.g., compared to virtual machines) include application level isolation, faster set up, reduced memory use, increased flexibility, and faster communication with hardware.

Returning to the example shown in FIG. 2, in some embodiments, at least a portion of mail transfer environment 200 runs on server 300 of FIG. 3. In some embodiments, virtualization containers 206 and 216 correspond to the containers shown in server 300 of FIG. 3. In the example shown, virtualization container 206 runs mail transfer agent 208 and virtualization container 216 runs mail transfer agent 218. Virtualization container 206 operates within container deployment unit 204 and virtualization container 216 operates within container deployment unit 214. In various embodiments, each container deployment unit is a software construct associated with each container that is managed by utility software processes associated with a container engine (e.g., container engine 306 of FIG. 3). For example, each container deployment unit is configured to interface with a corresponding storage portion (e.g., storage portion 210 for container deployment unit 204 and storage portion 220 for container deployment unit 214). Container deployment units are also configured to interface with load balancer 202 and operator unit 230.

The example shown is illustrative and not restrictive. Any number of container deployment units with corresponding storage portions is possible. Each mail transfer agent (MTA) is one or more software processes configured to route and/or send electronic mail. It is not necessary for all MTAs to run on a single server. The MTAs may be distributed across different servers that are communicative connected (e.g., via network 106 of FIG. 1). Such a framework allows for high availability and scalability (e.g., in a datacenter environment). Similarly, the storage portions may also be distributed. Each storage portion may be provisioned by an administrator or dynamically provisioned and may exist in a cluster environment representing a storage node just as each container deployment unit represents a computing node. Storage portion 210 and storage portion 220 can include various types of storage, including but not limited to RAM, cache memory, buffer memory, flash memory, and fixed mass storage (e.g., hard disk drive storage, solid-state drive storage, etc.).

In various embodiments, load balancer 202 is one or more software processes of a container engine (e.g., container engine 306 of FIG. 3). Load balancer 202 distributes computing load across the various container deployments units. For example, as various electronic mail messages arrive at mail transfer environment 200, e.g., from multiple senders, load balancer 202 can distribute the various electronic mail messages approximately evenly to the container deployment units so that the corresponding mail transfer agents receive an approximately equal number of messages to process. In this manner, transfer of electronic mail messages is processed in parallel to increase message transfer throughput. In various embodiments, each container deployment unit that runs a mail transfer agent processes a batch of messages assigned by load balancer 202 by storing the messages, sending the messages, and then deleting the messages from storage.

In the example illustrated, each container deployment unit is associated with a storage portion. In some embodiments, an association is made between a container deployment unit and a storage portion through a persistent volume claim (PVC) to store and receive email messages. As used herein, a PVC refers to a request for storage that is met by binding the PVC to a persistent volume (PV). In various embodiments, the PVC is an abstraction layer for underlying storage. A number of static PVs can be created that can later be bound to one or more PVCs. PVs are useful because container storage via a container's root file system can disappear upon container and/or container deployment unit deletion. PVs can store data outside of containers and/or container deployment units to provide non-transitory locations to prevent data from being lost. PVs offer persistent storage that allows data to remain intact regardless of whether container data structures to which PVs are connected are terminated. Stated alternatively, containers are typically stateless but can store state through a PVC mechanism. In some embodiments, if no static PV matches a user's PVC request, a new PV may be dynamically created to match the PVC request.

In various embodiments, each mail transfer agent is configured to connect to a dedicated PVC and thus dedicated storage portion. Thus, in various embodiments, each mail transfer agent is configured to access a provisioned storage volume resource of a data storage. In various embodiments, provisioning of storage is performed through a PVC mechanism. The provisioned storage volume resources are shown in FIG. 2 as the various storage portions (e.g., storage portions 210 and 220). The provisioned storage volume resources are part of a larger, general data storage. This data storage may be a RAM, cache memory, buffer memory, flash memory, and/or fixed mass storage, such as hard disk drive or solid-state drive storage. As used herein, a container deployment unit's corresponding storage portion and the container deployment unit's corresponding PVC are referred to interchangeably.

The architecture shown in FIG. 2 allows for elastic computing and automatic failover. For example, when a mail transfer agent failure, container failure, or container deployment unit failure is detected, it is possible to instantiate an additional container deployment unit to attach to the same storage portion/PVC. In some embodiments, operator unit 230 detects anomalies, failures, and/or terminations associated with mail transfer agents, virtualization containers, and container deployment units. As described in further detail below (e.g., see FIG. 4), in various embodiments, operator unit 230 is responsible for instantiating new container deployment units, draining undelivered messages in orphaned storage portions, and other operations associated with handling failures and/or terminations associated with container deployment units. In various embodiments, operator unit 230 is one or more software processes running in the background as the various mail transfer agents process electronic mail messages. In some embodiments, operator unit 230 is a part of a platform associated with a container engine (e.g., container engine 306 of FIG. 3). In some embodiments, operator 230 is computer code of a container platform implementing call back logic in which custom error reconciliation logic can be inserted based on application type. The reconciliation logic can enforce a desired state for a mail transfer environment (e.g., mail transfer environment 200 of FIG. 2). For example, if a desired state is to have only 3 container deployment units running mail transfer agents, then in response to a detection of an actual state having 4 container deployment units running mail transfer agents, operator unit 230 can detect this anomaly and call reconciliation logic to ensure that once a mail transfer agent of one of the container deployment units has been terminated, its storage portion/PVC is found, a drainer unit is attached to the storage portion/PVC, undelivered messages are drained, and resources, including the empty storage portion/PVC, are released.

In various embodiments, as described in further detail below, upon detection of a failure or termination associated with a mail transfer agent, container, or container deployment unit, unsent messages are drained from the corresponding storage portion and handled. In various embodiments, mail transfer agents are configured to receive messages via the SMPT protocol and use the PVC mechanism to store messages in storage. Mail transfer agents also examine the storage to determine if there are any unprocessed messages, in which case, the unprocessed messages are retrieved and sent to recipients. In many scenarios, messages need to be stored in storage before being sent to recipients because there is a delay in mail transfer processing and it is not possible or feasible to send all messages as they are received by a mail transfer agent. In various embodiments, once a message enters storage through the PVC mechanism, an acknowledgment to a requestor has already been given, indicating that a guarantee has already been made that the message will be delivered.

Storage portions/PVCs can be orphaned from container deployment units in scale down scenarios. For example, container deployment units may be shut down, leading to orphaned storage portions/PVCs and unsent messages being stuck in the orphaned storage portions/PVCs. Because guarantees have already been made that these unsent messages (in failure or scale down scenarios) will be delivered, these unsent have to be handled. A benefit of the techniques disclosed herein is automatic handling of these messages. Prior approaches have employed manual transitioning of these messages, which is error prone. Furthermore, substantial delay is introduced by manually processing and delivering these messages. An example of a scale down scenario is termination of container deployment units (and thus termination of corresponding containers and mail transfer agents) during times of day (e.g., non-peak hours) when electronic message load is reduced. For example, during the middle of the night, message traffic is oftentimes substantially reduced, allowing for scaling down of message distribution, meaning a substantial number of mail transfer agents can be terminated. In such a scale down scenario, unsent messages in storage portions/PVCs that are orphaned from their corresponding mail transfer agents need to be handled. In some embodiments, operator unit 230 detects terminations of container deployment units and monitors for orphaned storage portions/PVCs.

The techniques disclosed herein increase efficiency by reducing errors and delays associated with manually handling orphaned unsent messages. Thus, the techniques disclosed herein allow for a scalable and elastic mail transfer architecture that is able to release computing resources (e.g., to other computing systems) as electronic mail load decreases (scaling down) as well as instantiate additional computing resources as electronic mail load increases (scaling up). Instantiating additional computing resources (e.g., container deployment units) does not involve handling unsent messages of orphaned storage portions/PVCs because queuing of messages in storage portions occurs after instantiation. Scaling down, on the other hand, involves handling of orphaned unsent messages because those messages will have been queued prior to scaling down. Thus, in this respect, scaling down can be considered more challenging than scaling up to create a scalable mail transfer architecture because of the orphaned unsent messages problem, which is addressed by the techniques disclosed herein. Stated alternatively, the techniques disclosed herein provide for a system that automatically scales up and down mail transfer agent resources in a run-time environment based on message load.

FIG. 3 is a diagram illustrating an example container virtualization architecture. Further description of FIG. 3 is provided above in the description of FIG. 2.

Figure 4:
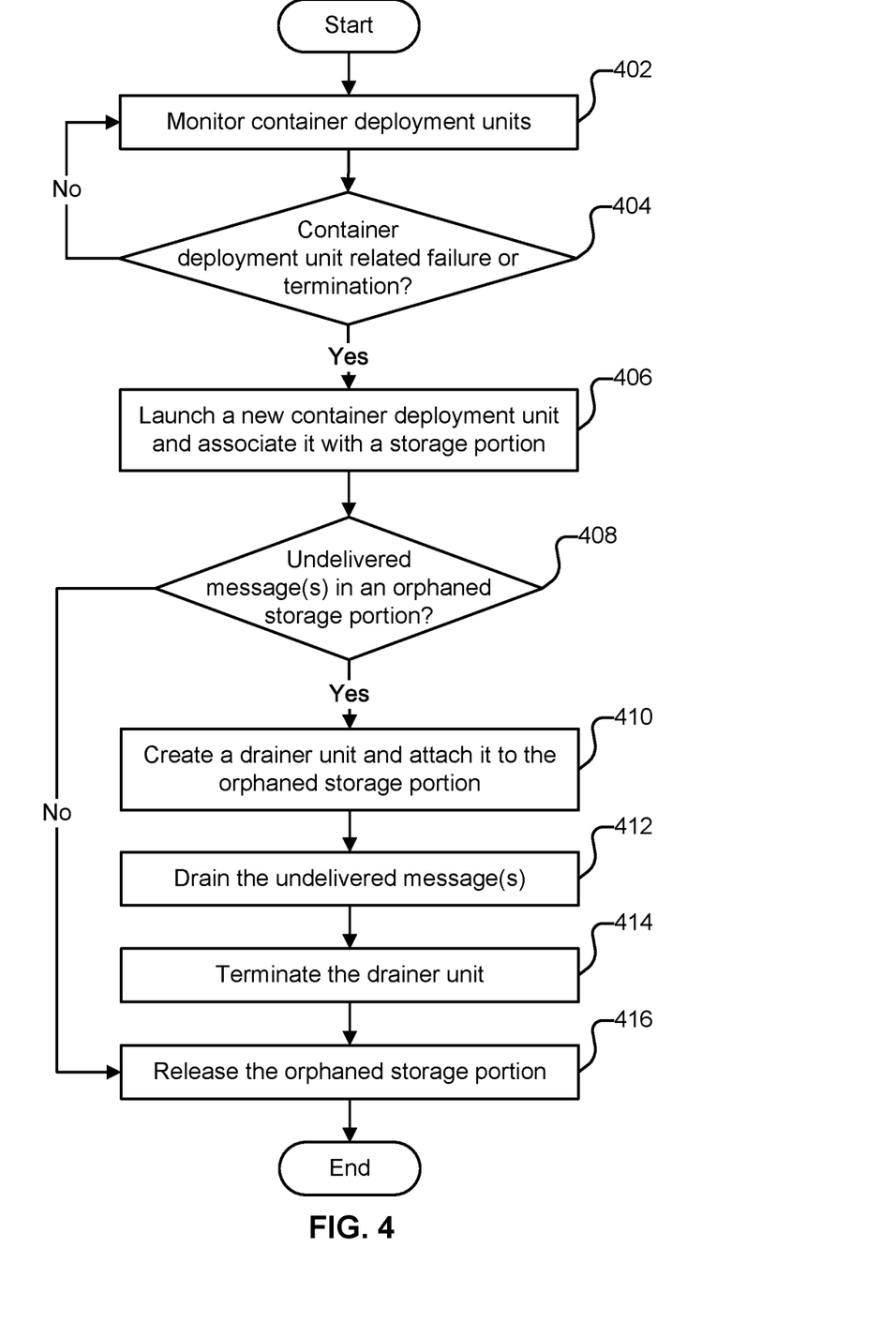
FIG. 4 is a flow chart illustrating an embodiment of a process for monitoring and handling orphaned messages.

FIG. 4 is a flow chart illustrating an embodiment of a process for monitoring and handling orphaned messages. In some embodiments, the process of FIG. 4 is performed by mail transfer environment 200 of FIG. 2. In various embodiments, at least a portion of the process of FIG. 4 is performed by operator unit 230 of FIG. 2.

At 402, container deployment units are monitored. In some embodiments, the container deployment units in mail transfer environment 200 of FIG. 2 are monitored. The monitored container deployment units house containerized mail transfer agents (e.g., mail transfer agents of mail transfer environment 200 of FIG. 2). The mail transfer agents are configured to route and/or send electronic mail. The mail transfer agents are also configured to access storage portions that store messages that are required to be delivered to recipient end users. The storage portions are persistent; thus, the containerized processes are stateful. The stored messages persist even if the mail transfer agents are released (e.g., due to virtualization containers housing the mail transfer agents being released). In some embodiments, the container deployment units are monitored by operator unit 230 of FIG. 2 or another software process of a platform associated with a container engine (e.g., container engine 306 of FIG. 3). In various embodiments, the container deployment units are monitored for failures, crashes, terminations, etc. of the container deployment units, associated virtualization containers, and/or associated mail transfer agents.

At 404, it is determined whether a container deployment unit related failure or termination has occurred. Examples of a failure include a software error or crash occurring in a mail transfer agent, a software error or crash occurring in a container housing the mail transfer agent, or a software error or crash occurring in a container deployment unit housing the container housing the mail transfer agent. Termination of the container deployment unit can occur as a result of such failures. Termination of the container deployment unit can also occur as a result of scaling down of mail transfer agents during a time period of reduced message traffic and thus reduced demand for mail transfer agents. In various embodiments, the container deployment unit being terminated results in an orphaned storage portion that may hold unsent messages. As an example, if container deployment unit 204 of FIG. 2 is determined to have been terminated, storage portion 210 (potentially storing messages that have yet to be delivered) would be orphaned. Unless messages in the orphaned storage portion are transitioned out and processed, they will not be delivered. In some embodiments, a software process (e.g., operator unit 230 of FIG. 2) queries various storage portions and/or associated PVCs to determine whether the storage portions and/or associated PVCs are mounted by container deployment units. If it is determined that such a query of "Mounted By" to a storage portion/PVC returns "None", then it is determined that the storage portion/PVC is orphaned. In some embodiments, monitoring/detection of failures, crashes, terminations, etc. occurs periodically. For example, in some embodiments, operator unit 230 of FIG. 2 enters a waking state periodically (e.g., every few minutes, every 10 minutes, every half hour, etc.) to determine whether there are any orphaned storage portions/PVCs.

If at 404 it is determined that no container deployment unit related failure or termination has occurred, monitoring of container deployment units continues at 402. If at 404 it is determined that a container deployment unit related failure or termination has occurred, at 406, a new container deployment unit is launched and associated with a storage portion/PVC. In some embodiments, this storage portion is a newly provisioned storage portion and thus would not already be storing any messages. It is also possible, in an alternative embodiment, to associate the new container deployment unit with an already provisioned storage portion, such as the orphaned storage portion (e.g., see FIG. 5). The new container deployment unit replaces a failed/terminated container deployment unit in order to replenish computing resources so as to allow similar message handling throughput and performance before the container deployment unit failure/termination occurred. In some scenarios, 406 is not performed. For example, in scale down scenarios, container deployment units running mail transfer agents are intentionally terminated to conserve computing resources; thus, replacement container deployment units running mail transfer agents are not needed. Though, undelivered messages in an orphaned storage portion would still need to be handled (as described below).

At 408, it is determined whether there are undelivered messages in an orphaned storage portion. In various embodiments, each container deployment unit mounts a storage portion. Thus, the container deployment unit that failed and/or was terminated would have orphaned a storage portion. Any undelivered messages in the orphaned storage portion would need to be delivered.

If at 408 it is determined that there is at least one undelivered message in the orphaned storage portion, at 410, a drainer unit is created and attached to the orphaned storage portion. In some embodiments, the drainer unit is instantiated by operator unit 230 of FIG. 2. In various embodiments, the drainer unit is one or more software processes configured to receive emails. The drainer unit attaches to the orphaned storage portion and/or associated PVC. In some embodiments, drainer unit attachment is verified when a "Mounted By" field of the orphaned storage portion/PVC has a value that includes "drainer" or a similar label. If at 408 it is determined that there are no undelivered messages in the orphaned storage portion, 410, 412, and 414 are skipped.

At 412, the undelivered message(s) are drained. In various embodiments, draining the undelivered messages includes transferring the undelivered messages from the orphaned storage portion to the drainer unit or storage associated with the drainer unit. In some embodiments, the drainer unit redistributes the undelivered messages to properly functioning container deployment units running mail transfer agents so that the undelivered messages can be delivered. In some embodiments, this redistribution occurs in a load balanced manner. For example, in some embodiments, the drainer unit transfers the undelivered messages to load balancer 202 of FIG. 2 and load balancer 202 then distributes the undelivered messages to container deployment units running mail transfer agents for processing similar to how load balancer 202 would distribute new incoming messages to the container deployment units.

At 414, the drainer unit is terminated. After the drainer unit transfers out the undelivered messages (e.g., to load balancer 202 of FIG. 2), resources associated with the drainer unit can be released. For example, processing and memory resources associated with the drainer unit can be released and software processes associated with the drainer unit can be terminated.

At 416, the orphaned storage portion is released (terminated). In various embodiments, storage associated with the orphaned storage portion is released so that it can be reclaimed for other uses. In some embodiments, operator unit 230 of FIG. 2 releases the orphaned storage portion and then returns to normal processing and a listening mode to monitor for failures, crashes, terminations, etc. associated with container deployment units running mail transfer agents. The above illustrates a "serverless" pattern in which no messages are lost. With respect to container deployment units that are terminated due to reduced demand for mail transfer activity, the system has been scaled down and quickly and automatically returned to a normal operating mode.

Figure 5:
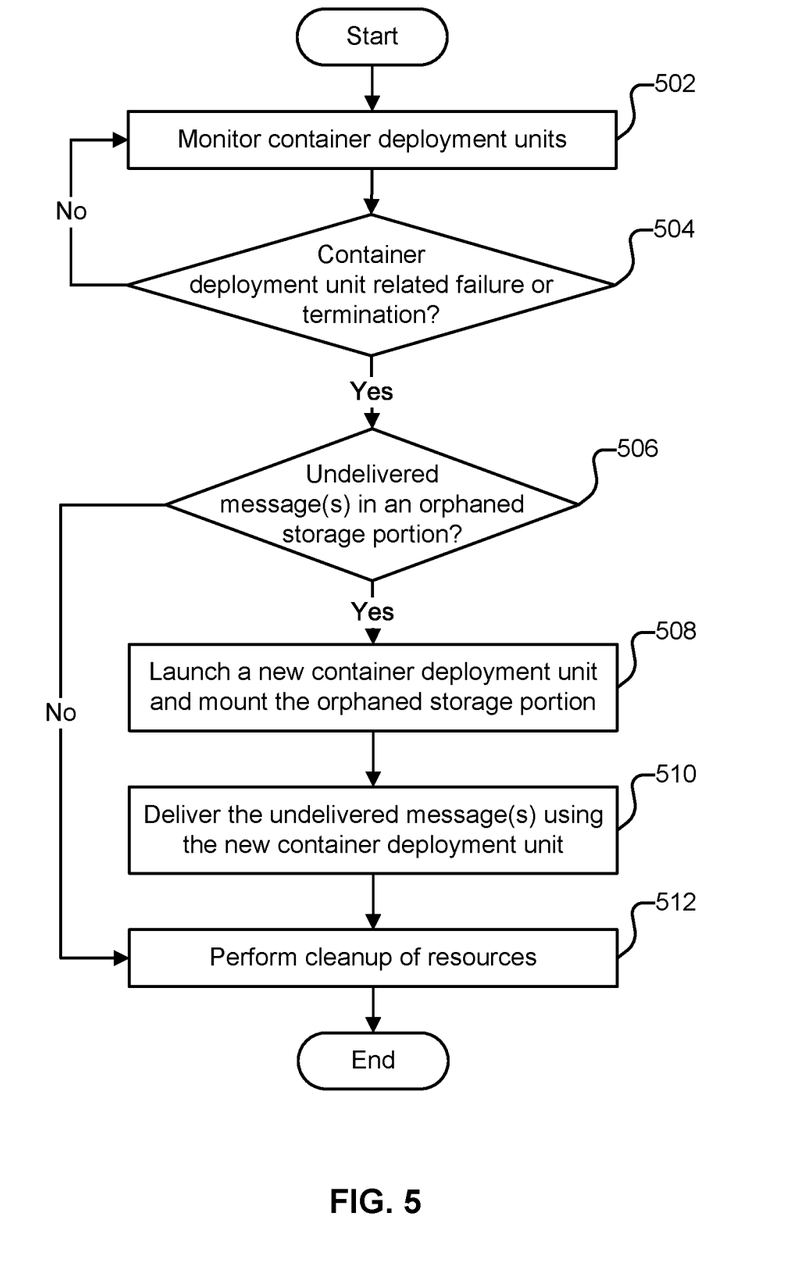
FIG. 5 is a flow chart illustrating an alternative embodiment of a process for monitoring and handling orphaned messages.

FIG. 5 is a flow chart illustrating an alternative embodiment of a process for monitoring and handling orphaned messages. In some embodiments, the process of FIG. 5 is performed by mail transfer environment 200 of FIG. 2. In various embodiments, at least a portion of the process of FIG. 5 is performed by operator unit 230 of FIG. 2.

At 502, container deployment units are monitored. In some embodiments, the container deployment units in mail transfer environment 200 of FIG. 2 are monitored. The monitored container deployment units house containerized mail transfer agents (e.g., mail transfer agents of mail transfer environment 200 of FIG. 2). The mail transfer agents are configured to route and/or send electronic mail. The mail transfer agents are also configured to access storage portions that store messages that are required to be delivered to recipient end users. The storage portions are persistent; thus, the containerized processes are stateful. The stored messages persist even if the mail transfer agents are released (e.g., due to virtualization containers housing the mail transfer agents being released). In some embodiments, the container deployment units are monitored by operator unit 230 of FIG. 2 or another software process of a platform associated with a container engine (e.g., container engine 306 of FIG. 3). In various embodiments, the container deployment units are monitored for failures, crashes, terminations, etc. of the container deployment units, associated virtualization containers, and/or associated mail transfer agents.

At 504, it is determined whether a container deployment unit related failure or termination has occurred. Examples of a failure include a software error or crash occurring in a mail transfer agent, a software error or crash occurring in a container housing the mail transfer agent, or a software error or crash occurring in a container deployment unit housing the container housing the mail transfer agent. Termination of the container deployment unit can occur as a result of such failures. Termination of the container deployment unit can also occur as a result of scaling down of mail transfer agents during a time period of reduced message traffic and thus reduced demand for mail transfer agents. In various embodiments, the container deployment unit being terminated results in an orphaned storage portion that may hold unsent messages. As an example, if container deployment unit 204 of FIG. 2 is determined to have been terminated, storage portion 210 (potentially storing messages that have yet to be delivered) would be orphaned. Unless messages in the orphaned storage portion are transitioned out and processed, they will not be delivered. In some embodiments, a software process (e.g., operator unit 230 of FIG. 2) queries various storage portions and/or associated PVCs to determine whether the storage portions and/or associated PVCs are mounted by container deployment units. If it is determined that such a query of "Mounted By" to a storage portion/PVC returns "None", then it is determined that the storage portion/PVC is orphaned. In some embodiments, monitoring/detection of failures, crashes, terminations, etc. occurs periodically. For example, in some embodiments, operator unit 230 of FIG. 2 enters a waking state periodically (e.g., every few minutes, every 10 minutes, every half hour, etc.) to determine whether there are any orphaned storage portions/PVCs.

If at 504 it is determined that no container deployment unit related failure or termination has occurred, monitoring of container deployment units continues at 502. If at 504 it is determined that a container deployment unit related failure or termination has occurred, at 506, it is determined whether there are undelivered messages in an orphaned storage portion. In various embodiments, each container deployment unit mounts a storage portion. Thus, a container deployment unit that failed and/or was terminated would have orphaned a storage portion. Any undelivered messages in the orphaned storage portion would need to be delivered.

If at 506 it is determined that there is at least one undelivered message in the orphaned storage portion, at 508, a new container deployment unit is launched and mounts the orphaned storage portion. In some embodiments, the new container deployment unit is instantiated by operator unit 230 of FIG. 2. The new container deployment unit is instantiated with a mail transfer agent running within a virtualization container. The new container deployment unit replaces a failed/terminated container deployment unit in order to replenish computing resources so as to allow similar message handling throughput and performance before container deployment unit failure/termination occurred. Furthermore, as described below, the new container deployment unit handles the undelivered messages in the orphaned storage portion. In some embodiments, mounting of the orphaned storage portion is verified when a "Mounted By" field of the orphaned storage portion has a value that indicates the new container deployment unit. If at 506 it is determined that there are no undelivered messages in the orphaned storage portion, 508 and 510 are skipped.

At 510, the undelivered messages are delivered using the new container deployment unit. In various embodiments, the new container deployment unit replaces the container deployment unit that has failed and/or was terminated. Thus, the undelivered messages are transitioned to a replacement container deployment unit running a replacement mail transfer agent for processing. The replacement mail transfer agent handles delivery processing.

At 512, cleanup of resources is performed. For example, processing and memory resources associated with the failed/terminated container deployment unit are released. In scenarios in which the orphaned storage portion does not have undelivered messages, the orphaned storage portion is released (terminated). In some embodiments, operator unit 230 of FIG. 2 performs the cleanup and then returns to normal processing and a listening mode to monitor for subsequent failures, crashes, terminations, etc. associated with container deployment units running mail transfer agents.

Figure 6:
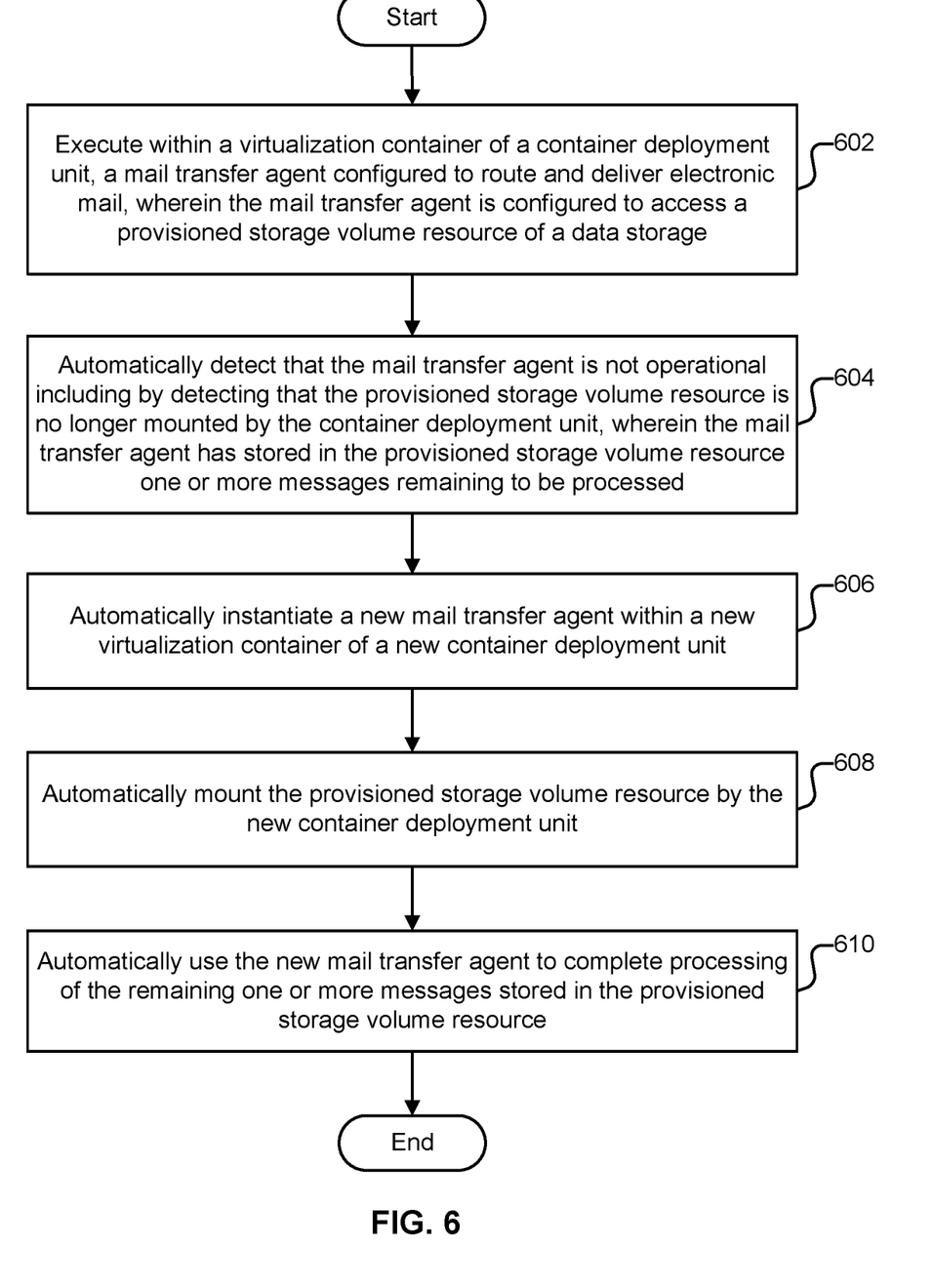
FIG. 6 is a flow chart illustrating an embodiment of a process for automatically handling messages of a non-operational mail transfer agent within a virtualization container.

FIG. 6 is a flow chart illustrating an embodiment of a process for automatically handling messages of a non-operational mail transfer agent within a virtualization container. In some embodiments, the process of FIG. 6 is performed by mail transfer environment 200 of FIG. 2. In various embodiments, at least a portion of the process of FIG. 6 is performed by operator unit 230 of FIG. 2.

At 602, a mail transfer agent configured to route and deliver electronic mail is executed within a virtualization container of a container deployment unit, wherein the mail transfer agent is configured to access a provisioned storage volume resource of a data storage. In some embodiments, the mail transfer agent is a mail transfer agent of mail transfer environment 200 of FIG. 2. In some embodiments, the provisioned storage volume resource is allocated through a PVC mechanism. The provisioned storage volume resource corresponds on a one-to-one basis with the mail transfer agent. Examples of the data storage include RAM, cache memory, buffer memory, flash memory, and/or fixed mass storage, such as hard disk drive or solid-state drive storage.

At 604, it is automatically detected that the mail transfer agent is not operational including by detecting that the provisioned storage volume resource is no longer mounted by the container deployment unit, wherein the mail transfer agent has stored in the provisioned storage volume resource one or more messages remaining to be processed. In some scenarios, the mail transfer agent is not operational because the mail transfer agent, the virtualization container, and/or the container deployment unit has experienced an error, a crash, a failure, etc. that has caused the mail transfer agent to not function properly. In some embodiments, operator unit 230 of FIG. 2 detects that the mail transfer agent is not operational.

At 606, a new mail transfer agent is automatically instantiated within a new virtualization container of a new container deployment unit. In some embodiments, operator unit 230 of FIG. 2 automatically instantiates the new mail transfer agent, virtualization container, and container deployment unit. In some embodiments, reconciliation logic (e.g., computer code) of operator unit 230 enforces a desired state (e.g., a specified number of mail transfer agents) in response to detecting a difference between the desired state and a current actual state (e.g., a deficit in the number of mail transfer agents caused by one or more mail transfer agents not being operational).

At 608, the provisioned storage volume resource is automatically mounted by the new container deployment unit. In some embodiments, operator unit 230 of FIG. 2 mounts the provisioned storage volume resource and confirms successful mounting based at least in part by querying a "Mounted By" field of the provisioned storage volume resource.

At 610, the new mail transfer agent is automatically used to complete processing of the remaining one or more messages stored in the provisioned storage volume resource. Because the provisioned storage volume resource has been mounted by the new container deployment unit, the new mail transfer agent is able to access the remaining one or more messages stored in the provisioned storage volume resource and process them (e.g., route and deliver them to intended recipients).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    executing within a virtualization container of a container deployment unit, a mail transfer agent configured to route and deliver electronic mail, wherein the mail transfer agent is configured to access a provisioned storage volume resource of a data storage; and
    automatically detecting that the mail transfer agent is not operational including by detecting that the provisioned storage volume resource is no longer mounted by the container deployment unit, wherein the mail transfer agent has stored in the provisioned storage volume resource one or more messages remaining to be processed.

2. The method of claim 1, further comprising automatically instantiating a new mail transfer agent within a new virtualization container of a new container deployment unit.

3. The method of claim 2, further comprising automatically mounting the provisioned storage volume resource by the new container deployment unit.

4. The method of claim 3, further comprising automatically using the new mail transfer agent to complete processing of the remaining one or more messages stored in the provisioned storage volume resource.

5. The method of claim 4, wherein automatically using the new mail transfer agent to complete processing of the remaining one or more messages stored in the provisioned storage volume resource includes transmitting the remaining one or more messages via a network and deleting the one or more messages from the provisioned storage volume resource.

6. The method of claim 1, further comprising transferring the one or more messages remaining to be processed from the provisioned storage volume resource into a drainer unit.

7. The method of claim 6, further comprising transferring the one or more messages from the drainer unit to a load balancing unit that is configured to distribute the one or more messages to one or more other container deployment units executing mail transfer agents within virtualization containers.

8. The method of claim 7, further comprising terminating the drainer unit.

9. The method of claim 6, further comprising terminating the provisioned storage volume resource.

10. The method of claim 1, wherein the mail transfer agent is not operational as a result of an error associated with at least one of the following: the mail transfer agent, the virtualization container, or the container deployment unit.

11. The method of claim 1, wherein the mail transfer agent is not operational as a result of an intentional termination of at least one of the following: the mail transfer agent, the virtualization container, or the container deployment unit.

12. The method of claim 11, wherein the intentional termination is associated with a period of reduced message traffic associated with a mail transfer environment comprising the mail transfer agent.

13. The method of claim 12, wherein the period includes a nighttime period.

14. The method of claim 1, wherein the provisioned storage volume resource is linked to the container deployment unit through a request to attach persistent storage to the container deployment unit.

15. The method of claim 1, wherein the data storage includes at least one of the following: random-access memory, cache memory, buffer memory, flash memory, hard disk drive storage, or solid-state drive storage.

16. The method of claim 1, wherein the container deployment unit is configured to access a platform comprising a plurality of software processes associated with a container engine.

17. The method of claim 16, wherein the plurality of software processes includes a software process that detects mounting by the container deployment unit of the provisioned storage volume resource.

18. The method of claim 1, wherein the container deployment unit, the virtualization container, and the mail transfer agent are included in a mail transfer environment configured to route messages between mail user agents connected via a network.

19. A system, comprising:
one or more processors configured to:
execute within a virtualization container of a container deployment unit, a mail transfer agent configured to route and deliver electronic mail, wherein the mail transfer agent is configured to access a provisioned storage volume resource of a data storage; and
automatically detect that the mail transfer agent is not operational including by detecting that the provisioned storage volume resource is no longer mounted by the container deployment unit, wherein the mail transfer agent has stored in the provisioned storage volume resource one or more messages remaining to be processed; and
a memory coupled to at least one of the one or more processors and configured to provide at least one of the one or more processors with instructions.

20. A computer program product embodied in a non-transitory computer readable medium and comprising computer instructions for:
executing within a virtualization container of a container deployment unit, a mail transfer agent configured to route and deliver electronic mail, wherein the mail transfer agent is configured to access a provisioned storage volume resource of a data storage; and
automatically detecting that the mail transfer agent is not operational including by detecting that the provisioned storage volume resource is no longer mounted by the container deployment unit, wherein the mail transfer agent has stored in the provisioned storage volume resource one or more messages remaining to be processed.

* * * * *